(12) United States Patent
Gao et al.

(10) Patent No.: US 12,214,800 B2
(45) Date of Patent: Feb. 4, 2025

(54) METHOD OF PROCESSING DATA FOR AUTONOMOUS VEHICLE, ELECTRONIC DEVICE, STORAGE MEDIUM AND AUTONOMOUS VEHICLE

(71) Applicant: Apollo Intelligent Driving Technology (Beijing) Co., Ltd., Beijing (CN)

(72) Inventors: Wei Gao, Beijing (CN); Wendong Ding, Beijing (CN); Guowei Wan, Beijing (CN); Liang Peng, Beijing (CN)

(73) Assignee: APOLLO INTELLIGENT DRIVING TECHNOLOGY (BEIJING) CO., LTD., Beijing (CN)

( * ) Notice: Subject to any disclaimer, the term of this patent is extended or adjusted under 35 U.S.C. 154(b) by 236 days.

(21) Appl. No.: 17/975,689

(22) Filed: Oct. 28, 2022

(65) Prior Publication Data

US 2023/0118945 A1    Apr. 20, 2023

(30) Foreign Application Priority Data

Nov. 2, 2021    (CN) .......................... 202111291238.0

(51) Int. Cl.
*B60W 60/00* (2020.01)
*B60K 35/00* (2006.01)
(Continued)

(52) U.S. Cl.
CPC ........... *B60W 60/001* (2020.02); *B60K 35/00* (2013.01); *B60W 40/10* (2013.01); *B60W 50/00* (2013.01);
(Continued)

(58) Field of Classification Search
CPC .... B60W 60/001; B60W 40/10; B60W 50/00; B60W 2050/0005; B60W 2420/403;
(Continued)

(56) References Cited

U.S. PATENT DOCUMENTS

| 11,514,607 B2 * | 11/2022 | Fang | ........................ G06T 7/246 |
| 11,543,263 B1 * | 1/2023 | Bosse | .................... G05D 1/027 |

(Continued)

FOREIGN PATENT DOCUMENTS

| CN | 109341706 A | 2/2019 |
| CN | 110009739 A | 7/2019 |

(Continued)

OTHER PUBLICATIONS

Machine tramslation for CN112598757A, Li Yuehua, Apr. 2, 2021.*

(Continued)

*Primary Examiner* — Abdalla A Khaled
(74) *Attorney, Agent, or Firm* — Keating & Bennett, LLP

(57) ABSTRACT

A method of processing data for an autonomous vehicle, an electronic device, a storage medium, and an autonomous vehicle are provided. The method includes: acquiring sensor data for the autonomous vehicle, wherein the sensor data includes inertial measurement data, LiDAR data, and visual image data; determining a first constraint factor for the inertial measurement data according to the inertial measurement data and the visual image data; determining a second constraint factor for the LiDAR data according to the inertial measurement data and the LiDAR data; determining a third constraint factor for the visual image data according to the inertial measurement data, the visual image data and the LiDAR data; and processing the sensor data based on the first constraint factor, the second constraint factor and the third constraint factor, so as to obtain positioning data for positioning the autonomous vehicle.

16 Claims, 4 Drawing Sheets

(51) Int. Cl.
*B60W 40/10* (2012.01)
*B60W 50/00* (2006.01)
*G01S 7/48* (2006.01)
*G01S 17/86* (2020.01)
*G01S 17/89* (2020.01)
*G06T 7/50* (2017.01)
*G06T 7/73* (2017.01)

(52) U.S. Cl.
CPC ............ *G01S 7/4808* (2013.01); *G01S 17/86* (2020.01); *G01S 17/89* (2013.01); *G06T 7/50* (2017.01); *G06T 7/73* (2017.01); *B60W 2050/0005* (2013.01); *B60W 2420/403* (2013.01); *B60W 2420/408* (2024.01); *B60W 2556/00* (2020.02); *G06T 2207/10028* (2013.01)

(58) Field of Classification Search
CPC ....... B60W 2420/408; B60W 2556/00; B60W 60/00; B60W 40/02; B60W 2050/0043; B60W 2050/0083; B60W 2556/35; B60K 35/00; G01S 7/4808; G01S 17/86; G01S 17/89; G01S 5/16; G01S 17/93; G06T 7/50; G06T 7/73; G06T 2207/10028; G06T 7/246; G06T 2207/10044; G01C 21/165; G01C 21/28
See application file for complete search history.

(56) References Cited

U.S. PATENT DOCUMENTS

| | | | | |
|---|---|---|---|---|
| 11,555,903 | B1* | 1/2023 | Kroeger | G05D 1/024 |
| 11,680,824 | B1* | 6/2023 | Navin | G01C 21/165 |
| | | | | 701/33.1 |
| 11,940,793 | B1* | 3/2024 | Kavalar | B60W 60/00 |
| 12,026,956 | B1* | 7/2024 | Purdy | G06T 7/20 |
| 12,046,052 | B2* | 7/2024 | Kim | G01S 17/931 |
| 2020/0334841 | A1* | 10/2020 | Cristobal | G06T 7/74 |
| 2021/0094550 | A1* | 4/2021 | Jiang | G01S 17/931 |
| 2021/0306243 | A1* | 9/2021 | Mori | G01S 19/48 |
| 2022/0041179 | A1* | 2/2022 | Anabuki | H04L 67/125 |
| 2022/0204019 | A1* | 6/2022 | Lauterbach | G06T 15/205 |
| 2022/0398825 | A1* | 12/2022 | Gao | G06V 10/464 |
| 2023/0111364 | A1* | 4/2023 | Chun | G01S 7/4808 |
| | | | | 382/100 |
| 2024/0095960 | A1* | 3/2024 | Qian | G06F 18/25 |

FOREIGN PATENT DOCUMENTS

| | | | |
|---|---|---|---|
| CN | 110906923 | A | 3/2020 |
| CN | 111595333 | A | 8/2020 |
| CN | 112304307 | A | 2/2021 |
| CN | 112598757 | A * | 4/2021 |
| CN | 112985394 | A | 6/2021 |

OTHER PUBLICATIONS

Official Communication issued in corresponding European Patent Application No. 22204106.3, mailed on Mar. 3, 2023.

Zhao et al., "Super odometry: IMU-centrict LiDAR-Visual-Inertial Estimator for Challenging Environments", Cornell Univeristy, Aug. 20, 2021, 8 pages.

Shan et al., "LVI-SAM: Tightly-coupled lidar-Visual-Inertial Odometry via Smoothing and Mapping", IEEE International Conference on Robotics and Automation (ICRA), May 31-Jun. 4, 2021, pp. 5692-5698.

Official Communication issued in corresponding Chinese Patent Application No. 202111291238.0, mailed on May 23, 2023.

* cited by examiner

METHOD OF PROCESSING DATA FOR AUTONOMOUS VEHICLE, ELECTRONIC DEVICE, STORAGE MEDIUM AND AUTONOMOUS VEHICLE

CROSS-REFERENCE TO RELATED APPLICATIONS

This application is claims priority to Chinese Application No. 202111291238.0 filed on Nov. 2, 2021, which is incorporated herein by reference in its entirety.

TECHNICAL FIELD

The present disclosure relates to a field of an intelligent transportation technology, in particular to a field of autonomous driving. More specifically, the present disclosure relates to a method of processing data for an autonomous vehicle, an electronic device, a storage medium, and an autonomous vehicle.

BACKGROUND

At present, there are many solutions for a visual/LiDAR odometry problem. Although existing methods may meet a need for online real-time applications, it is generally required to consume a lot of CPU computing resources.

SUMMARY

The present disclosure provides a method of processing data for an autonomous vehicle, an electronic device, a storage medium, and an autonomous vehicle.

According to an aspect of the present disclosure, a method of processing data for an autonomous vehicle is provided, including: acquiring sensor data for the autonomous vehicle, wherein the sensor data includes inertial measurement data, LiDAR data, and visual image data; determining a first constraint factor for the inertial measurement data according to the inertial measurement data and the visual image data; determining a second constraint factor for the LiDAR data according to the inertial measurement data and the LiDAR data; determining a third constraint factor for the visual image data according to the inertial measurement data, the visual image data and the LiDAR data; and processing the sensor data based on the first constraint factor, the second constraint factor and the third constraint factor, so as to obtain positioning data for positioning the autonomous vehicle.

According to another aspect of the present disclosure, an electronic device is provided, including: at least one processor; and a memory communicatively connected to the at least one processor, wherein the memory stores instructions executable by the at least one processor, and the instructions, when executed by the at least one processor, cause the at least one processor to implement the method of processing data for the autonomous vehicle as described above.

According to another aspect of the present disclosure, a non-transitory computer-readable storage medium having computer instructions therein is provided, and the computer instructions are configured to cause a computer to implement the method of processing data for the autonomous vehicle as described above.

According to another aspect of the present disclosure, an autonomous vehicle including the electronic device described above is provided.

It should be understood that content described in this section is not intended to identify key or important features in embodiments of the present disclosure, nor is it intended to limit the scope of the present disclosure. Other features of the present disclosure will be easily understood through the following description.

BRIEF DESCRIPTION OF THE DRAWINGS

The accompanying drawings are used for better understanding of the solution and do not constitute a limitation to the present disclosure, wherein.

DETAILED DESCRIPTION OF EMBODIMENTS

Figure 1:
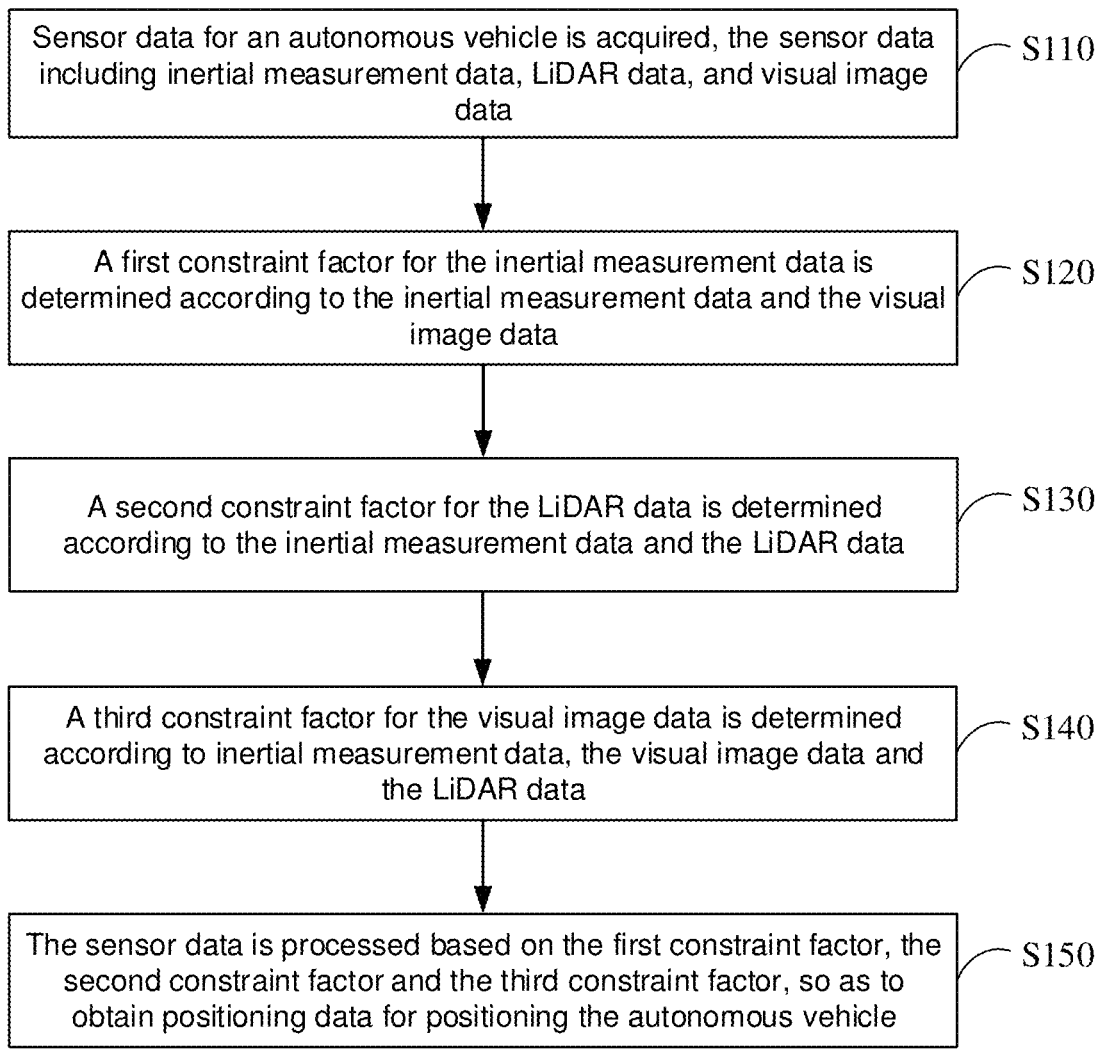
FIG. 1 schematically shows a flowchart of a method of processing data for an autonomous vehicle according to embodiments of the present disclosure.

Exemplary embodiments of the present disclosure will be described below with reference to accompanying drawings, which include various details of embodiments of the present disclosure to facilitate understanding and should be considered as merely exemplary. Therefore, those ordinary skilled in the art should realize that various changes and modifications may be made to embodiments described herein without departing from the scope and spirit of the present disclosure. Likewise, for clarity and conciseness, descriptions of well-known functions and structures are omitted in the following description.

Terms used herein are only intended to describe specific embodiments and are not intended to limit the present disclosure. Terms "including", "containing", etc. used herein indicate the presence of the described features, steps, operations and/or components, but do not exclude the presence or addition of one or more other features, steps, operations and/or components.

All terms (including technical and scientific terms) used herein have meanings generally understood by those ordinary skilled in the art, unless otherwise defined. It should be noted that the terms used herein should be interpreted as having the meaning consistent with the context of the present disclosure, and should not be interpreted in an idealized or overly rigid manner.

In a case that an expression similar to "at least one selected from A, B, or C" is used, the expression should generally be interpreted according to the meaning of the expression generally understood by those of ordinary skilled in the art (for example, "a system having at least one selected from A, B, or C" shall include, but is not limited to, a system having A alone, having B alone, having C alone, having A and B, having A and C, having B and C, and/or having A, B and C, etc.).

Positioning calculation using a visual/LiDAR odometry usually consumes a lot of CPU computing resources in a process of. Therefore, it is useful in practice to build an odometry based on vision, LiDAR and inertial measurement units, which has a high precision, a low usage of CPU resources, and a reasonable utilization of GPU resources. Embodiments of the present disclosure provide a method of building an odometry based on vision, LiDAR and inertial measurement units, and positioning an autonomous vehicle by using the odometry based on vision, LiDAR and inertial measurement units.

For ease of description, symbols used in the present disclosure are explained as follows. $(\bullet)^w$ represents a global coordinate system, that is, an IMU (inertial measurement unit) coordinate system corresponding to an initial key frame of a system. $(\bullet)^b$ represents a local coordinate system, that is, an IMU coordinate system. $(\bullet)^c$ represents a visual coordinate system. A rotation matrix R and a Hamilton-style unit quaternion q herein are used to express a rotation. $q_b^w$ and $p_b^w$ represent a rotation value and a translation value from the local coordinate system to the global coordinate system. $R_{veh}^b$ and $t_{veh}^b$ represent an external parameter relationship from a vehicle body coordinate system to the local coordinate system. $b_k$ represents a local coordinate system when processing a $k^{th}$ frame of data. $c_k$ represents a $k^{th}$ frame of visual image data. $v_{b_k}^w$ represents a value of a velocity of the IMU at the $k^{th}$ frame in the global coordinate system. $v_{b_k}^{b_k}$ represents a value of a velocity of the IMU at the $k^{th}$ frame in the local coordinate system of a corresponding frame. $b_\omega$ represents a bias of an IMU gyroscope, and $b_a$ represents a bias of an IMU accelerometer. $g^w$ represents a value of a gravitational acceleration in the global coordinate system, which is established by an initialization. $\widehat{(\cdot)}$ represents measurement data with noise or estimation data with some uncertainty. $\otimes$ represents a multiplication of two quaternions, and X represents a vector product of two three-dimensional vectors.

Embodiments of the present disclosure provide a method of processing data for an autonomous vehicle, including: acquiring sensor data for an autonomous vehicle, where the sensor data includes inertial measurement data, LiDAR data and visual image data. Then, a first constraint factor for the inertial measurement data is determined according to the inertial measurement data and the visual image data, a second constraint factor for the LiDAR data is determined according to the inertial measurement data and the LiDAR data, and a third constraint factor for the visual image data is determined according to the inertial measurement data, the visual image data and the LiDAR data. Next, the sensor data is processed based on the first constraint factor, the second constraint factor and the third constraint factor, so as to obtain positioning data for positioning the autonomous vehicle.

A method of processing data for an autonomous vehicle according to exemplary embodiments of the present disclosure will be described below with reference to FIG. 1 to FIG. 4.

FIG. 1 schematically shows a flowchart of a method of processing data for an autonomous vehicle according to embodiments of the present disclosure.

As shown in FIG. 1, a method 100 of processing data for an autonomous vehicle in embodiments of the present disclosure may include, for example, operation S110 to operation S150.

In operation S110, sensor data for an autonomous vehicle is acquired, the sensor data including inertial measurement data, LiDAR data, and visual image data.

In operation S120, a first constraint factor for the inertial measurement data is determined according to the inertial measurement data and the visual image data.

In operation S130, a second constraint factor for the LiDAR data is determined according to the inertial measurement data and the LiDAR data.

In operation S140, a third constraint factor for the visual image data is determined according to inertial measurement data, the visual image data and the LiDAR data.

In operation S150, the sensor data is processed based on the first constraint factor, the second constraint factor and the third constraint factor, so as to obtain positioning data for positioning the autonomous vehicle.

For example, during a driving process of the autonomous vehicle, data may be acquired through a variety of types of sensors, which may include, but not be limited to an inertial measurement unit, a LiDAR, or a camera. The inertial measurement unit may include but not be limited to, for example, an IMU gyroscope and a wheel speedometer.

After the sensor data is acquired, the first constraint factor, the second constraint factor and the third constraint factor may be obtained based on the sensor data. Then, the sensor data is processed based on the first constraint factor, the second constraint factor and the third constraint factor to obtain the positioning data, so that the autonomous vehicle may be positioned based on the positioning data.

It may be understood that in embodiments of the present disclosure, the sensor data is acquired by the inertial measurement unit, the LiDAR and the camera, and a data processing is performed based on the sensor data to achieve the positioning of the autonomous vehicle, so that a positioning accuracy of the autonomous vehicle may be improved. In addition, GPU resources may be reasonably used in a process of performing the data processing based on the sensor data, so that a usage of CPU resources may be reduced, and a computing speed may be improved while saving resources.

Figure 2:
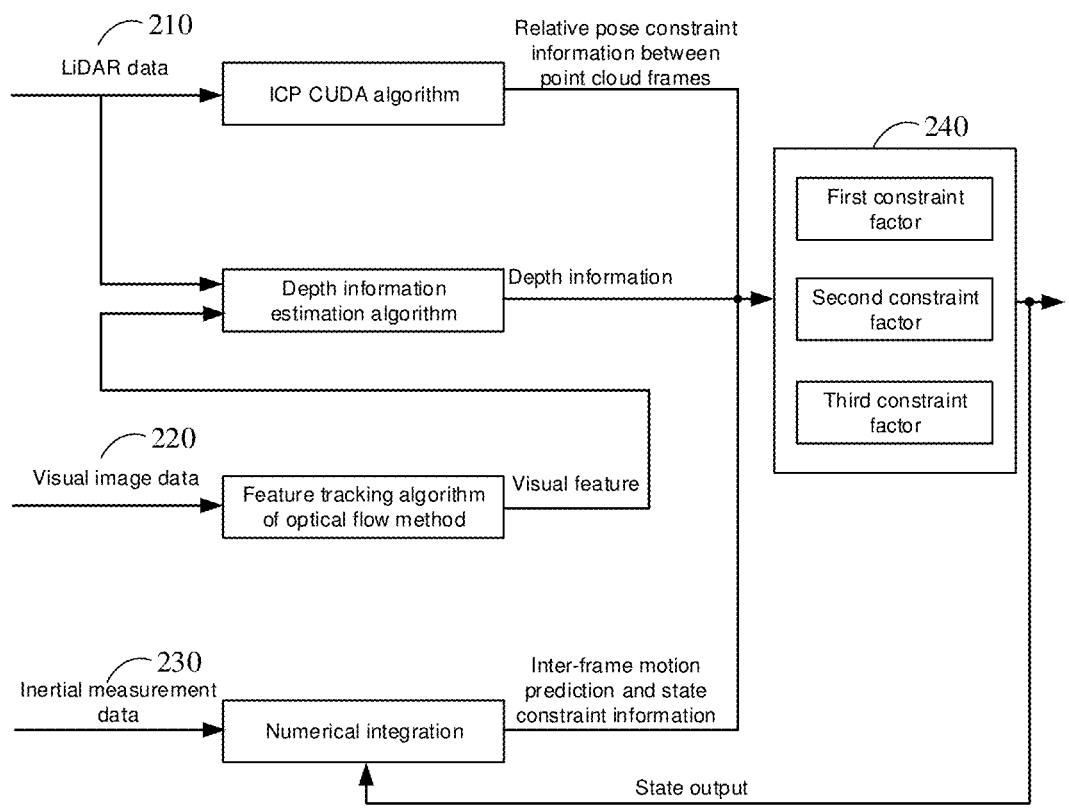
FIG. 2 schematically shows a schematic diagram of a method of processing data for an autonomous vehicle according to embodiments of the present disclosure.

FIG. 2 schematically shows a schematic diagram of a method of processing data for an autonomous vehicle according to embodiments of the present disclosure.

As shown in FIG. 2, according to embodiments of the present disclosure, LiDAR data 210, visual image data 220 and inertial measurement data 230 are acquired firstly. Then, the LiDAR data 210 is processed based on an ICP CUDA (Iterative Closet Point Compute Unified Device Architecture) algorithm to obtain a relative pose constraint information between point cloud frames. The visual image data 220 is processed using a feature tracking algorithm such as optical flow method to obtain a visual feature. A depth information is obtained based on the visual feature and the LiDAR data 210 by using a depth information estimation algorithm. A numerical integration is performed on the inertial measurement data 230 to obtain inter-frame motion prediction and state constraint information. The inertial measurement data 230 may include, for example, IMU data and wheel speedometer data.

Next, a fusion calculation is performed based on the relative pose constraint information between point cloud frames, the depth information, the inter-frame motion prediction and state constraint information, so as to obtain a plurality of constraint factors 240, which may include, for example, a first constraint factor, a second constraint factor, and a third constraint factor.

After the plurality of constraint factors 240 are obtained, at least one of the plurality of constraint factors 240 may be used as a state output to calibrate the inertial measurement unit. A calibration process may include, for example, performing the numerical integration on the inertial measurement data by using at least one of the plurality of constraint factors 240 as a constraint.

For the inertial measurement data, it is assumed that two frames of inertial measurement data correspond to time instants $t_k$ and $t_{k+1}$, respectively, and a plurality of measurements of IMU and wheel speedometer are performed between these two time instants. Ignoring an influence of the rotation of the Earth, it is possible to calculate a relative pose relationship between the local coordinate systems at the time instants corresponding to these two frames directly according to a measurement value of the IMU gyroscope and a measurement value of the wheel speedometer.

For example, an integration may be performed directly on an angular velocity information output by the IMU, so as to obtain a rotation part. For example, the rotation part may be calculated as follows.

$$q_{b_{k+1}}^{b_k} = \int_{t_k}^{\tau_{k+1}} \frac{1}{2} q_t^{b_k} \otimes (\hat{\omega}_t - \hat{b}_{\omega_t}) dt \qquad (1)$$

The velocity of the IMU in the local coordinate system may be directly calculated according to an output of the wheel speedometer and the external parameter relationship, and then an integration may be performed on the velocity to obtain a displacement part. For example, the velocity of the IMU at the time instant t may be calculated as follows.

$$v_t^{b_k} = q_t^{b_k} \otimes \left( R_{veh}^b \begin{bmatrix} whe_{asw}^b eed \\ 0 \end{bmatrix} \right) - (\hat{\omega}_t - \hat{b}_{\omega_t}) \times t_{veh}^b \otimes q_t^{b_k*} \qquad (2)$$

where wheel_speed represents a speed measurement value of the wheel speedometer, which is a scalar. A relative displacement between frames may be obtained by performing an integration on the speed measurement value. The relative displacement between frames may be calculated as follows.

$$t_{b_{k+1}}^{b_k} = \int_{t_k}^{\tau_{k+1}} v_t^{b_k} dt \qquad (3)$$

For the visual image data, it is possible to use an indirect method, that is, to extract a feature of the visual image data and obtain a motion constraint between visual image frames (i.e., visual frames).

For the second constraint factor, a depth information of the visual image data may be obtained by using the LiDAR data, and the second constraint factor for the LiDAR data may be determined by using the depth information.

For example, the LiDAR data may include a plurality of frames of laser point cloud data. Determining the second constraint factor for the LiDAR data according to the inertial measurement data and the LiDAR data may include the following process, for example.

Firstly, an initial relative pose between a first frame of laser point cloud data and a second frame of laser point cloud data among the plurality of frames of laser point cloud data may be determined according to the inertial measurement data, the first frame of laser point cloud data and the second frame of laser point cloud data.

Then, a first projection data of the first frame of laser point cloud data and a second projection data of the second frame of laser point cloud data may be determined respectively.

Next, the initial relative pose may be adjusted according to the first projection data and the second projection data to obtain a relative pose between point cloud frames, and the second constraint factor may be determined according to the relative pose between point cloud frames.

Exemplarily, the first projection data and the second projection data both include N voxels, for example, where N is an integer greater than 1. The initial relative pose may be adjusted according to the first projection data and the second projection data to obtain the relative pose between point cloud frames. For example, N iterations may be performed according to each of the N voxels and the initial relative pose, so as to obtain an $N^{th}$ relative pose as the relative pose between point cloud frames.

Exemplarily, the first projection data may include, for example, a first projection image and a first normal vector, and the second projection data may include, for example, a second projection image and a second normal vector. The $N^{th}$ relative pose may be obtained by performing N iterations.

For example, an $i^{th}$ iteration in the N iterations may include: determining a distance threshold and an angle threshold according to i, where i is greater than or equal to 1 and less than or equal to N. In a case that it is determined that a distance between an $i^{th}$ first pixel in the first projection image and an $i^{th}$ second pixel in the second projection image is less than or equal to the distance threshold and that an angle between the first normal vector corresponding to an $i^{th}$ pixel and the second normal vector corresponding to the $i^{th}$ pixel is less than or equal to the angle threshold, an $i^{th}$ relative pose may be determined by using an $(i-1)^{th}$ relative pose obtained from an $(i-1)^{th}$ iteration, the $i^{th}$ first pixel, the $i^{th}$ second pixel, the first normal vector corresponding to the $i^{th}$ pixel and the second normal vector corresponding to the $i^{th}$ pixel. For example, the $i^{th}$ pixel may include, for example, the $i^{th}$ first pixel and the $i^{th}$ second pixel, the $i^{th}$ first pixel corresponds to the first normal vector, and the $i^{th}$ second pixel corresponds to the second normal vector.

According to embodiments of the present disclosure, the LiDAR (Laser Radar) data may include laser point cloud data, and a registration may be performed using two frames of point cloud data. Therefore, any method that may achieve a registration of two frames of point cloud data is theoretically applicable to embodiments of the present disclosure. This has an advantage that an implementation is easier to expand.

Through the registration of different frames of point cloud data, it is possible to obtain the relative pose relationship of the IMU coordinate systems at corresponding time instants. Through an ICP (Iterative Closet Point) method performed by GPU, a time consumption for the registration of two frames of point cloud data may be reduced, and thus the registration of multiple pairs of key frames of point cloud data may be quickly completed. A method of improving a degradation factor based on the ICP method may be implemented to improve an accuracy of an original method in a LiDAR degradation scene.

In an example, according to two frames of laser point cloud data with motion compensation, A={$a_i$} and B={$b_i$}, and an initial relative pose $T_0$ of the two frames of point cloud data, it is possible to obtain a modified relative pose T of the two frames of point cloud data. An example process is as follows.

Points in point clouds A and B are projected to a two-dimensional plane according to an angle of a horizontal direction and an angle of a vertical direction, and the normal vector of each point is calculated to generate a first projection image $A_{uvmap}$ and a second projection image $B_{uvmap}$.

An initial value of T is $T_0$, iteration_time represents an index of iteration, and an initial value of iteration_time is 0. The following operations are performed for N points until an output result converges.

The $i^{th}$ iteration is performed as follows.

An angle threshold angle_thresh is set according to iteration_time, and a distance threshold dis_thresh is set according to iteration_time. In an example, a frame rate of the visual image data is 15 Hz, a frame rate of the laser point cloud data is 10 Hz, the distance threshold is max (0.5, 4.0-0.5*iteration_time)m, and the angle threshold is max (10.0, 30.0-5.0*iteration_time)°.

A two-dimensional projection position of $b_i$ in $A_{uvmap}$ is calculated according to T, and a matching point $a_{b_i}$ is found according to a two-dimensional distance. In a case of $dist(a_{b_i}, b_i) \leq dis\_thres$ and $angle(A_{uvmap}[a_{b_i}].norm(\ ), B_{uvmap}[b_i].norm(\ )) \leq angle\_thresh$, $r_i \leftarrow (T \cdot b_i - a_{b_i}) \cdot A_{uvmap}[a_{b_i}].norm(\ )$, $$J_i \leftarrow \frac{\partial r_i}{\partial T};$$

otherwise $r_i \leftarrow 0$, $J_i \leftarrow 0$.

Next, $\leftarrow \Sigma_i J_i^T J_i$, $g \leftarrow \Sigma_i - J_i^T r_i$, that is, a merge summation is performed. Then, $H \Delta T = g$ is solved using a degradation factor H, so as to obtain $\Delta T$. $T \leftarrow T \oplus T$. The symbol "←" represents an assignment.

For an $(i+1)^{th}$ iteration, let iteration_time+1, and the above calculation process may be repeated.

The distance threshold and the angle threshold in each iteration decrease with an increase of the number of iterations, which is beneficial to eliminate an outlier such as a dynamic object as the iteration converges, and improve an accuracy of the registration. In an example, the iteration may be performed using a Gauss-Newton method, and the degenerate factor is used to ensure that T is updated iteratively only in a non-degeneration degree of freedom. The degradation factor is defined as a minimum feature value of H, and a corresponding feature vector is a feature degradation degree of freedom.

It should be noted that the above algorithms may be executed in parallel on the GPU, so that the usage of CPU resources may be reduced, and a processing efficiency may be improved.

Those skilled in the art may understand that for the visual image data, a consistent observation may be constructed based on a plurality of visual image frames, so as to be used for a subsequent calculation of a re-projection error of image feature points.

For the third constraint factor, the third constraint factor for the visual image data may be determined according to the inertial measurement data, the visual image data and the LiDAR data.

For example, a depth information of the visual image data may be determined according to the visual image data and the LiDAR data. Then, a mapping relationship between the visual image data and the inertial measurement data may be determined according to the visual image data and the inertial measurement data, and the third constraint factor may be determined according to the depth information and the mapping relationship.

For the depth information, it is possible to determine an initial inertial measurement relative pose at a visual image acquisition time instant of the visual image data relative to a radar data acquisition time instant $t_l$ of adjacent radar data. Then, a first projection position $p_{img}^{t_c}$ of the LiDAR data to an image data plane may be determined according to the visual image acquisition time instant $t_c$, the radar data acquisition time instant and the initial inertial measurement relative pose $T_{t_l}^{t_c}$. Next, an image projection time instant and an updated inertial measurement relative pose $T_{t_l}^{t_c'}$ may be determined according to the first projection position, and the depth information $\lambda_l$ of the visual image data may be determined according to the updated inertial measurement relative pose.

Exemplarily, determining the image projection time instant and the updated inertial measurement relative pose according to the first projection position may include the following process. Firstly, a first inertial measurement relative pose at the visual image acquisition time instant relative to the image projection time instant is determined, and a second inertial measurement relative pose at the image projection time instant relative to the laser data acquisition time instant is determined. Then, an interpolation is performed on the initial inertial measurement relative pose by using the first inertial measurement relative pose and the second inertial measurement relative pose, so as to obtain the updated inertial measurement relative pose.

For the method of calculating the depth with an assistance of laser point cloud, reference is made to an implementation of LIMO (Lidar Monocular Visual Odometry). For a new frame of visual image data, it is possible to obtain the radar data acquisition time instant $t_l$ of adjacent radar data according to the acquisition time instant $t_c$ of the visual image data, so as to obtain laser point cloud data at the radar data acquisition time instant $t_l$. The relative pose relationship $T_{t_l}^{t_c}$ of the IMU coordinate system between the time instant $t_c$ and the time instant $t_l$ may be obtained by the method of directly performing an integration on the IMU data and the wheel speedometer data or the method of performing an integration on only the IMU data described above.

The point cloud data may be projected onto the visual image plane by using the relative pose relationship and a camera internal parameter model.

$$p_{img}^{t_c} = \pi_c \left( T_b^c T_{t_l}^{t_c} p_b^{t_l} \right) \qquad (4)$$

where $\pi_c$ represents a camera projection model, $T_b^c$ represents an external parameter from the IMU coordinate system to the camera coordinate system, and $p_b^{t_l}$ represents a coordinate of a point in the laser point cloud in the IMU coordinate system.

For a camera with Rolling Shutter, there may be an error in the above projection of the point cloud to the visual image plane. In order to reduce an influence of the Rolling Shutter on the projection error, a double projection method may be used in an actual calculation. In a first projection, a row where the projected laser point is approximately located may be obtained using Equation (4). In a second projection, the image projection time $t_c'$ and the used relative pose relationship $T_{t_l}^{t_c'}$ may be updated according to the row number.

Figure 3:
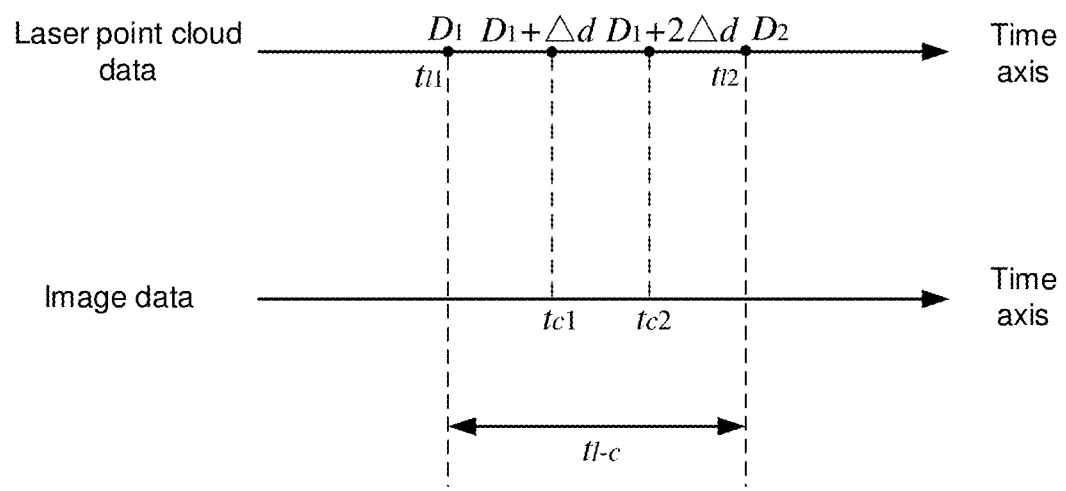
FIG. 3 schematically shows a schematic diagram of a principle of an interpolation calculation according to embodiments of the present disclosure.

The updated relative pose is calculated using a linear interpolation. FIG. 3 shows an example of the linear interpolation.

FIG. 3 schematically shows a schematic diagram of a principle of an interpolation calculation according to embodiments of the present disclosure.

As shown in FIG. 3, according to embodiments of the present disclosure, adjacent radar data acquisition time instants $t_{l1}$ and $t_{l2}$ may be obtained according to the acquisition time $t_c$ of the visual image data, the point cloud data may be projected to the image plane for a first time based on depth information $D_1$ and $D_2$ of the point cloud data at the time instants $t_{l1}$ and $t_{l2}$, so as to obtain a range of rows $t_{l-c}$ where the projected laser points are located. Then, the second projection is performed by means of linear interpolation. For example, the point cloud data may be projected to a visual image plane corresponding to acquisition time instants $t_{c1}$ and $t_{c2}$ based on the depth information $D_1+\Delta d$ and $D_1+2\Delta d$ and the range of rows $t_{l-c}$. Thus, the depth information at the acquisition time instants $t_{c1}$ and $t_{c2}$ may be obtained by interpolation.

After the LiDAR data and the visual image data are fused by the projection method, a depth of a visual feature point may be calculated by using a point cloud data patch around the visual feature point. An example method is similar to LIMO and will not be described in detail here.

Those skilled in the art may understand that, in addition to the above-mentioned method of calculating the depth value by using the laser point cloud data according to the present disclosure, the depth value may also be calculated using a triangulation of multiple frames of visual image, which is not limited in the present disclosure. Since a vertical viewing angle of a LiDAR is generally smaller than a viewing angle of a visual image acquisition device of a camera, or a valid observation distance of the LiDAR is limited, some visual image areas may not be covered by the laser point cloud data. Therefore, the depth information of some visual feature points may not be calculated from the laser point cloud data. For these visual feature points, the depth of feature points may be calculated by triangulation of multiple frames of image observation data, that is, only a feature point that is stably tracked for more than a certain number of frames is triangulated. Compared with a two-frame triangulation, this method may be implemented to estimate the depth of the feature points more accurately, so that a negative impact of an error in an estimation of feature point depth on an accuracy of a motion estimation may be reduced.

According to embodiments of the present disclosure, a graph optimization method based on a sliding window may be adopted. A state of each visual or LiDAR key frame may be represented by a node in the graph, and a state of each node is defined as:

$$x_k=[p_{b_k}^m, v_{b_k}^w, q_{b_k}^w, b_{a_k}, b_{\omega_k}], k \in [0, n-1] \quad (5)$$

An overall state of the system is:

$$X=[x_0, x_1, \ldots, x_{n-1}] \quad (6)$$

where X represents the positioning data, based on which the autonomous vehicle may be positioned. For example, the positioning data may be used in fields of environment perception, motion control, relative positioning, map construction, etc.

Figure 4:
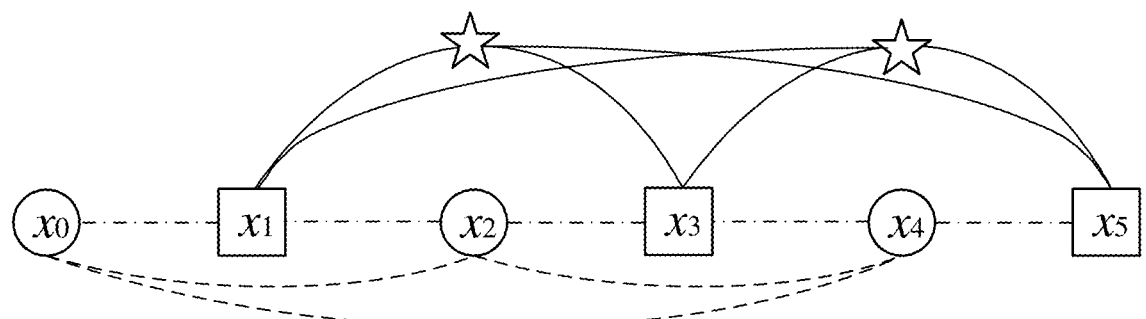
FIG. 4 schematically shows a schematic diagram of a factor graph according to embodiments of the present disclosure.

FIG. 4 schematically shows a schematic diagram of a factor graph according to embodiments of the present disclosure.

As shown in FIG. 4, according to embodiments of the present disclosure, a hollow circle represents a LiDAR node, a hollow square represents a visual node, a hollow pentagram represents a visual feature, a dot dash line represents an IMU pre-integration factor, a dashed line represents an ICP factor, and a line segment represents a visual factor. For an edge in the factor graph, when a length of the sliding window reaches a maximum value, a new key frame node is inserted, and an oldest key frame node is deleted. An image data feature no longer associated with observation frames may also be deleted to ensure that a computational complexity may not increase over time. In an example, the maximum value of the length of the sliding window may be, for example, 40. The IMU pre-integration factor in FIG. 4 may be, for example, the first constraint factor, the ICP factor may be, for example, the second constraint factor, and the visual factor may be, for example, the third constraint factor.

In order to optimize the positioning data X, the sensor data may be processed based on the first constraint factor, the second constraint factor and the third constraint factor to obtain the positioning data for positioning the autonomous vehicle. For example, X may be determined as the positioning data according to the following equations.

$$\min_X \left\{ \sum \left\| r_{imu}(\hat{z}_{b_{k+1}}^{b_k}, X) \right\|^2 + \sum \left\| r_{vision}(\hat{z}_l^{c_j}, X) \right\|^2 + \sum \left\| r_{icp}(\hat{z}_s^e, X) \right\|^2 \right\} \quad (7)$$

where $r_{imu}(\hat{z}_{b_{k+1}}^{b_k}, X)$ represents the first constraint factor, $r_{vision}(\hat{z}_l^{c_j}, X)$ represents the third constraint factor, $r_{icp}(\hat{z}_s^e, X)$ represents the second constraint factor; $\hat{z}_{b_{k+1}}^{b_k}$ represents the inertial measurement data, $z_l^{c_j}$ represents the visual image data, and $\hat{z}_{s_e}$ represents the LiDAR data.

$$\min_X \left\{ \sum_{k \in \mathcal{F}} \left\| r_{imu}(\hat{z}_{b_{k+1}}^{b_k}, X) \right\|_{P_{b_{k+1}}^{b_k}}^2 + \sum_{(l,j) \in V} \left\| r_{vision}(\hat{z}_l^{c_j}, X) \right\|_{P_l^{c_j}}^2 + \sum_{(s,e) \in L} \left\| r_{icp}(\hat{z}_s^e, X) \right\|_{P_s^e}^2 \right\} \quad (8)$$

The IMU pre-integration factor $r_{imu}$ represents a constraint relationship created for states between adjacent key frames according to an IMU pre-integration result. According to embodiments of the present disclosure, a unified serial IMU pre-integration factor is created for a visual image key frames and laser point cloud key frames. With the IMU pre-integration factor, the IMU measurement value may be effectively used to constrain the states of all dimensions of the node, so as to help effectively estimate a velocity of the node.

The visual factor $r_{vision}$ represents a constraint relationship created for visual key frames. According to embodiments of the present disclosure, the re-projection error is used as the visual factor. In addition, an influence of the Rolling Shutter on the plane projection coordinate is eliminated when calculating the re-projection error.

$$T_{b_i}^{rw} = (R_{b_i}^{rw}, p_{b_i}^{rw}) = f_{slerp}(T_{b_i}^w, \Delta T_i, v_l^{c_i}) \quad (9)$$

$$T_{b_j}^{rw} = (R_{b_j}^{rw}, p_{b_j}^{rw}) = f_{slerp}(T_{b_j}^w, \Delta T_j, v_l^{c_j}) \quad (10)$$

-continued $$P_l^{c_j} = \pi_c(R_b^c(R_w^{'b_j}(R_{b_i}^{'w}(R_c^b \frac{1}{\lambda_l} \pi_c^{-1}(\begin{bmatrix} u_l^{c_i} \\ v_l^{c_i} \end{bmatrix}) + p_c^b) + p_{b_i}^{'w} - p_{b_j}^{'w}) - p_c^b)) \quad (11)$$

$$r_{vision}(\hat{z}_l^{c_j}, X) = \begin{bmatrix} u_l^{c_j} \\ v_l^{c_j} \end{bmatrix} - P_l^{c_j} \quad (12)$$

where, $$\begin{bmatrix} u_l^{c_i} \\ v_l^{c_i} \end{bmatrix} \text{ and } \begin{bmatrix} u_l^{c_j} \\ v_l^{c_j} \end{bmatrix}$$

represent observations for the visual feature point l in the $i^{th}$ frame and the $j^{th}$ frame, respectively. $\Delta T_i$ and $\Delta T_j$ represent relative motions of the IMU coordinate system during a generation of the two frames of visual data, which may be set as constants in the optimization process using a predicted motion prior value. $T'_{b_i}{}^w$ and $T'_{b_j}{}^w$ represent states of the IMU coordinate system at corresponding time instants, which are obtained by performing a linear interpolation of motion according to row coordinates of the feature point on the corresponding imaging plan. This is a correction to an imaging time state of the Rolling Shutter image sensor. $\pi_c$ represents a camera projection model. $\pi_c^{-1}$ represents an inverse process of the camera projection model. $\lambda_l$ represents an inverse depth value of the visual feature l observed in the $i^{th}$ frame. For example, the visual image data may be fused with the point cloud data according to Equation (4), so as to obtain a fused image, and the inverse depth value $\lambda_l$ may be calculated according to the point cloud data patch around the feature point of the image data in the fused image, which is not limited in the present disclosure.

The ICP factor $r_{icp}$ represents a state constraint created for a LiDAR key frame.

$$r_{icp}(\hat{z}_s^e, x) = \text{Log}((T_s^w{}^{-1} T_e^w)^{-1} \hat{T}_e^s) \quad (13)$$

where $\hat{T}_e^s$ represents a relative pose between laser point cloud frames output by a LiDAR front end, which may be, for example, the above-mentioned T obtained based on the ICP method; Log represents a logarithmic mapping of a three-dimensional rigid body transformation, resulting a six-dimensional vector.

According to embodiments of the present disclosure, the inertial measurement data is acquired by an inertial sensor, and a velocity and an acceleration of the inertial sensor may be initialized according to the LiDAR data and the first constraint factor.

Exemplarily, the inertial sensor needs to be initialized. A purpose of initialization is to estimate a state of a key frame node, including a global pose, a velocity, an accelerometer bias, a gyroscope bias, etc. by constructing an initial key frame sequence, and estimate a direction of gravity so as to establish an accurate initial state of the system. The initialization is a premise of a normal operation of the system. For a system with a visual image sensor, it is further needed to build a scale information of a visual map in the initialization process. If the initialization accuracy is not high or even no initialization is performed, the system state is difficult to converge, thus reducing the system accuracy.

According to embodiments of the present disclosure, the inertial sensor may be initialized using the LiDAR data. In addition, the inertial sensor may also be initialized using the visual image data and the wheel speedometer data.

In a case that the inertial sensor is initialized using the LiDAR data, for example, the relative motion between frames may be calculated through the LiDAR front end in a non-degeneration scene. A subsequent initialization process may include a gyroscope bias estimation stage and a velocity and gravitational acceleration estimation stage.

For the gyroscope bias estimation stage, the initialization may be implemented using VINS-Mono (Versatile Monocular Visual Inertial State Estimator, an open-source monocular inertial visual odometry VIO developed by Hong Kong University of Science and Technology). In the gyroscope bias estimation stage, the gyroscope bias of the IMU may be calculated according to an estimation of a rotational motion between key frames and a pre-integration result of the IMU on the rotational motion. After the gyroscope bias of the IMU is updated, the pre-integration needs to be performed again to ensure an accuracy of the pre-integration result. For sake of brevity, details will not be described in embodiments of the present disclosure.

For the velocity and gravitational acceleration estimation stage, a state variable to be estimated may include:

$$X_I = [v_{b_0}{}^w, v_{b_1}{}^w, \ldots, v_{b_{n-1}}{}^w, g^w] \quad (14)$$

In the velocity and gravitational acceleration estimation stage, the following initialization problem may be constructed by combining a motion estimation result and a velocity and displacement result in the IMU pre-integration:

$$\min_{X_I} \left\{ \sum_{k \in \mathcal{F}} \left\| r_{imu}^I(\hat{z}_{b_{k+1}}^{b_k}, X_I) \right\|^2 + \left\| \|g^w\|^2 - 9.8^2 \right\|^2 \right\} \quad (15)$$

where $\mathcal{F}$ represents a set of key frames in the sliding window.

In this optimization problem, an optimization objective function is an IMU pre-integration residual, which represents a difference between a velocity and displacement component of the IMU pre-integration result and an estimation value, so as to provide a constraint on a velocity state and a gravitational acceleration state of the system node:

$$r_{imu}^I(\hat{z}_{b_{k+1}}^{b_k}, X_I) \begin{bmatrix} p_{b_{k+1}}^w - p_{b_k}^w + \frac{1}{2} g^w \Delta t_k^2 - v_{b_k}^w - R_{b_k}^w \hat{\alpha}_{b_{k+1}}^{b_k} \\ v_{b_{k+1}}^w + g^w \Delta t_k - v_{b_k}^w - R_{b_k}^w \hat{\beta}_{b_{k+1}}^{b_k} \end{bmatrix} \quad (16)$$

where $p_{b_k}{}^w$ and $R_{b_k}{}^w$ are known quantities, which are calculated from the LiDAR data and need not to be optimized.

Another optimization objective function is based on a fact that a magnitude of gravitational acceleration on the Earth's surface is approximated as a constant 9.8 m/s², so as to ensure that the gravitational acceleration may be calculated more accurately.

According to embodiments of the present disclosure, it is not necessary to optimize a rotation component and a translation component that may be directly observed, but only the velocity component, the IMU gyroscope bias and the gravitational acceleration vector are optimized. An initial value of the IMU accelerometer bias may be set to zero. The above method may be used in a wide range, and it is also applicable to a method of obtaining a relative motion between frames through other sensors.

For example, the IMU may be initialized by using an inter-frame constraint obtained from the visual image data, and it is only required to calculate $p_{b_k}{}^w$ and $R_{b_k}{}^w$ in Equation (16) from the visual image data.

The initialization may be performed using the visual image data and the wheel speedometer data without LiDAR data. Since the gyroscope bias is assumed to be zero when the inter-frame motion is calculated using the IMU and the wheel speedometer, an estimation of the gyroscope bias is omitted in such initialization method, and the gyroscope bias is directly assumed to be zero.

The initialization with an assistance of wheel speedometer data has advantages that it is simple be to implemented, has a low requirement on the initial motion condition, and generally has a sufficient accuracy, thus avoiding an excessive size caused by a requirement of a simple IMU and visual initialization on a vehicle mobility.

For the initialization of the system including the visual image sensor, it is necessary to establish the depth information of the visual feature point in addition to estimating the node state. In an example, it may be implemented by BA (Bundle Adjustment).

According to the technical solution of embodiments of the present disclosure, a higher processing efficiency is required since the visual and LiDAR data need to be processed. In particular, since data processing requires more computation, it is necessary to process the visual image data and the LiDAR frame data in parallel. However, in the data fusion part, the visual key frame node and the LiDAR key frame node are optimized by using the same factor graph, and the visual key frame nodes and the LiDAR key frame nodes are previously connected in sequence in a chronological order through the IMU pre-integration factor, so the IMU pre-integration operation is required to be serial processing. Similarly, for the data fusion part, since the overall system shares the same sliding window, and the sliding window contains visual image key frames and LiDAR key frames, the update of the sliding window and the operation of fusion and optimization require a thread synchronization, that is, parallel processing. In view of this, the parallel processing may be performed using the GPU, so that the usage of CPU resources may be reduced, and the GPU resources may be reasonably used.

According to an implementation, separate threads may be created to process the visual image data and the LiDAR data respectively, so as to enable the parallel processing. For serial processing such as the IMU pre-integration, a correctness of timing may be ensured by the thread synchronization.

Figure 5:
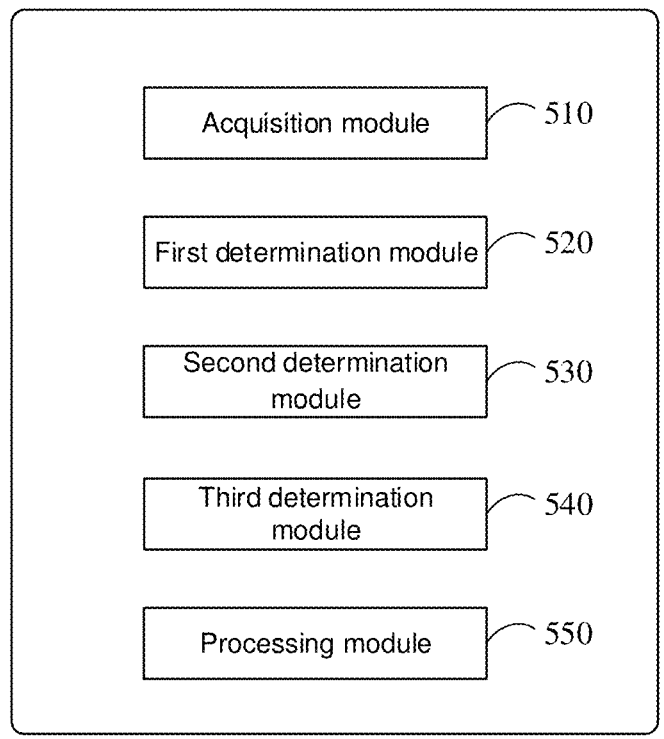
FIG. 5 schematically shows a block diagram of an apparatus for processing data for an autonomous vehicle according to embodiments of the present disclosure.

FIG. 5 schematically shows a block diagram of an apparatus for processing data for an autonomous vehicle according to embodiments of the present disclosure.

As shown in FIG. 5, an apparatus for processing data 500 for an autonomous vehicle in embodiments of the present disclosure may include, for example, an acquisition module 510, a first determination module 520, a second determination module 530, a third determination module 540, and a processing module 550.

The acquisition module 510 may be used to acquire sensor data for the autonomous vehicle, and the sensor data includes inertial measurement data, LiDAR data, and visual image data. According to embodiments of the present disclosure, the acquisition module 510 may perform, for example, the operation S110 described above with reference to FIG. 1, which will not be repeated here.

The first determination module 520 may be used to determine a first constraint factor for the inertial measurement data according to the inertial measurement data and the visual image data. According to embodiments of the present disclosure, the first determination module 520 may perform, for example, the operation S120 described above with reference to FIG. 1, which will not be repeated here.

The second determination module 530 may be used to determine a second constraint factor for the LiDAR data according to the inertial measurement data and the LiDAR data. According to embodiments of the present disclosure, the second determination module 530 may perform, for example, the operation S130 described above with reference to FIG. 1, which will not be repeated here.

The third determination module 540 may be used to determine a third constraint factor for the visual image data according to the inertial measurement data, the visual image data and the LiDAR data. According to embodiments of the present disclosure, the third determination module 540 may perform, for example, the operation S140 described above with reference to FIG. 1, which will not be repeated here.

The processing module 550 may be used to process the sensor data based on the first constraint factor, the second constraint factor and the third constraint factor, so as to obtain positioning data for positioning the autonomous vehicle. According to embodiments of the present disclosure, the processing module 550 may perform, for example, the operation S150 described above with reference to FIG. 1, which will not be repeated here.

According to embodiments of the present disclosure, the LiDAR data includes a plurality of frames of laser point cloud data; the second determination module 530 includes a first determination sub-module, a second determination sub-module, an adjustment sub-module, and a third determination sub-module. The first determination sub-module is used to determine an initial relative pose between a first frame of laser point cloud data and a second frame of laser point cloud data among the plurality of frames of laser point cloud data according to the inertial measurement data, the first frame of laser point cloud data and the second frame of laser point cloud data. The second determination sub-module is used to determine first projection data of the first frame of laser point cloud data and second projection data of the second frame of laser point cloud data, respectively. The adjustment sub-module is used to adjust the initial relative pose according to the first projection data and the second projection data, so as to obtain a relative pose between point cloud frames. The third determination sub-module is used to determine the second constraint factor according to the relative pose between point cloud frames.

According to embodiments of the present disclosure, the first projection data includes N voxels, the second projection data includes N voxels, and N is an integer greater than 1; the adjustment sub-module is further used to: perform N iterations according to each of the N voxels and the initial relative pose, so as to obtain an Nth relative pose as the relative pose between point cloud frames.

According to embodiments of the present disclosure, the first projection data includes a first projection image and a first normal vector, and the second projection data includes a second projection image and a second normal vector; the adjustment sub-module is further used to: perform an $i^{th}$ iteration in the N iterations, including: determining a distance threshold and an angle threshold according to i, where i is greater than or equal to 1 and less than or equal to N; and determining, in response to a determination that a distance between an $i^{th}$ first pixel in the first projection image and an $i^{th}$ second pixel in the second projection image is less than or equal to the distance threshold and that an angle between the first normal vector corresponding to an $i^{th}$ pixel and the second normal vector corresponding to the $i^{th}$ pixel is less than or equal to the angle threshold, an $i^{th}$ relative pose by using an $(i-1)^{th}$ relative pose obtained by an $(i-1)^{th}$ iteration, the $i^{th}$ first pixel, the $i^{th}$ second pixel, the first normal vector corresponding to the $i^{th}$ pixel, and the second normal vector corresponding to the $i^{th}$ pixel.

According to embodiments of the present disclosure, the third determination module 540 includes a fourth determination sub-module, a fifth determination sub-module, and a sixth determination sub-module. The fourth determination sub-module is used to determine a depth information of the visual image data according to the visual image data and the LiDAR data. The fifth determination sub-module is used to determine a mapping relationship between the visual image data and the inertial measurement data according to the visual image data and the inertial measurement data. The sixth determination sub-module is used to determine the third constraint factor according to the depth information and the mapping relationship.

According to embodiments of the present disclosure, the fourth determination sub-module includes a first determination unit, a second determination unit, a third determination unit, and a fourth determination unit. The first determination unit is used to determine an initial inertial measurement relative pose at a visual image acquisition time instant of visual image data relative to a radar data acquisition time instant of adjacent radar data. The second determination unit is used to determine a first projection position of the LiDAR data to a visual image data plane according to the visual image acquisition time instant, the radar data acquisition time instant and the initial inertial measurement relative pose. The third determination unit is used to determine an image projection time instant and an updated inertial measurement relative pose according to the first projection position. The fourth determination unit is used to determine the depth information of the visual image data according to the updated inertial measurement relative pose.

According to embodiments of the present disclosure, the third determination unit includes a first determination sub-unit, a second determination sub-unit, and an interpolation sub-unit. The first determination sub-unit is used to determine a first inertial measurement relative pose at the visual image acquisition time instant relative to the image projection time instant. The second determination sub-unit is used to determine a second inertial measurement relative pose at the image projection time instant relative to the laser data acquisition time instant. The interpolation sub-unit is used to perform an interpolation on the initial inertial measurement relative pose by using the first inertial measurement relative pose and the second inertial measurement relative pose, so as to obtain the updated inertial measurement relative pose.

According to embodiments of the present disclosure, the processing module 550 is further used to determine X as the positioning data. The X satisfies:

$$\min_X \left\{ \sum \left\| r_{imu}\left(\hat{z}^{b_k}_{b_{k+1}}, X\right) \right\|^2 + \sum \left\| r_{vision}(\hat{z}^{c_j}_l, X) \right\|^2 + \sum \left\| r_{icp}(\hat{z}^e_s, X) \right\|^2 \right\},$$

where $r_{imu}\left(\hat{z}^{b_k}_{b_{k+1}}, X\right)$ represents the first constraint factor, $r_{vision}(\hat{z}^{c_j}_l, X)$ represents the third constraint factor, $r_{icp}(\hat{z}^e_s, X)$ represents the second constraint factor;

$\hat{z}^{b_k}_{b_{k+1}}$ represents the inertial measurement data, $\hat{z}^{cis\,j}_l$ represents the visual image data, and $\hat{z}^e_s$ represents the LiDAR data.

According to embodiments of the present disclosure, the inertial measurement data is acquired by an inertial sensor; the apparatus 500 may further include: an initialization module used to initialize a velocity of the inertial sensor and an acceleration of the inertial sensor according to the LiDAR data and the first constraint factor.

In the technical solution of the present disclosure, an acquisition, a storage, a use, a processing, a transmission, a provision and a disclosure of user personal information and location information involved comply with provisions of relevant laws and regulations, and do not violate public order and good custom.

According to embodiments of the present disclosure, the present disclosure further provides an electronic device, a readable storage medium, and a computer program product.

Figure 6:
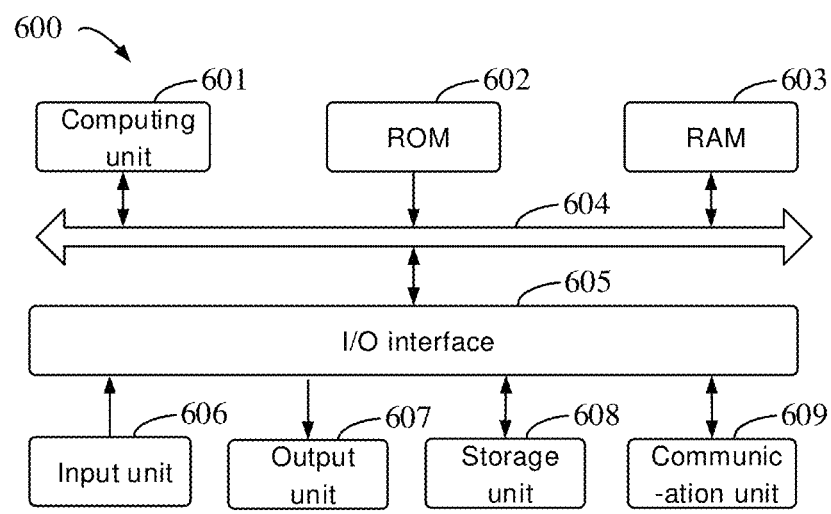
FIG. 6 shows a block diagram of an electronic device for implementing a method of processing data for an autonomous vehicle according to embodiments of the present disclosure.

According to embodiments of the present disclosure, an autonomous vehicle is provided, including the electronic device shown in FIG. 6.

FIG. 6 shows a block diagram of an electronic device for implementing the method of processing data for the autonomous vehicle according to embodiments of the present disclosure.

FIG. 6 shows a schematic block diagram of an exemplary electronic device 600 for implementing embodiments of the present disclosure. The electronic device 600 is intended to represent various forms of digital computers, such as a laptop computer, a desktop computer, a workstation, a personal digital assistant, a server, a blade server, a mainframe computer, and other suitable computers. The electronic device may further represent various forms of mobile devices, such as a personal digital assistant, a cellular phone, a smart phone, a wearable device, and other similar computing devices. The components as illustrated herein, and connections, relationships, and functions thereof are merely examples, and are not intended to limit the implementation of the present disclosure described and/or required herein.

As shown in FIG. 6, the electronic device 600 includes a computing unit 601 which may perform various appropriate actions and processes according to a computer program stored in a read only memory (ROM) 602 or a computer program loaded from a storage unit 608 into a random access memory (RAM) 603. In the RAM 603, various programs and data necessary for an operation of the electronic device 600 may also be stored. The computing unit 601, the ROM 602 and the RAM 603 are connected to each other through a bus 604. An input/output (I/O) interface 605 is also connected to the bus 604.

A plurality of components in the electronic device 600 are connected to the I/O interface 605, including: an input unit 606, such as a keyboard, or a mouse; an output unit 607, such as displays or speakers of various types; a storage unit 608, such as a disk, or an optical disc; and a communication unit 609, such as a network card, a modem, or a wireless communication transceiver. The communication unit 609 allows the electronic device 600 to exchange information/data with other devices through a computer network such as Internet and/or various telecommunication networks.

The computing unit 601 may be various general-purpose and/or dedicated processing assemblies having processing and computing capabilities. Some examples of the computing units 601 include, but are not limited to, a central processing unit (CPU), a graphics processing unit (GPU), various dedicated artificial intelligence (AI) computing chips, various computing units that run machine learning model algorithms, a digital signal processing processor (DSP), and any suitable processor, controller, microcontroller, etc. The computing unit 601 executes various methods and steps described above, such as the method of processing data for the autonomous vehicle. For example, in some embodiments, the method of processing data for the autonomous vehicle may be implemented as a computer software program which is tangibly embodied in a machine-readable medium, such as the storage unit 608. In some embodiments, the computer program may be partially or entirely loaded and/or installed in the electronic device 600 via the ROM 602 and/or the communication unit 609. The computer program, when loaded in the RAM 603 and executed by the computing unit 601, may execute one or more steps in the method of processing data for the autonomous vehicle described above. Alternatively, in other embodiments, the computing unit 601 may be configured to perform the method of processing data for the autonomous vehicle by any other suitable means (e.g., by means of firmware).

Various embodiments of the systems and technologies described herein may be implemented in a digital electronic circuit system, an integrated circuit system, a field programmable gate array (FPGA), an application specific integrated circuit (ASIC), an application specific standard product (ASSP), a system on chip (SOC), a complex programmable logic device (CPLD), a computer hardware, firmware, software, and/or combinations thereof. These various embodiments may be implemented by one or more computer programs executable and/or interpretable on a programmable system including at least one programmable processor. The programmable processor may be a dedicated or general-purpose programmable processor, which may receive data and instructions from a storage system, at least one input device and at least one output device, and may transmit the data and instructions to the storage system, the at least one input device, and the at least one output device.

Program codes for implementing the methods of the present disclosure may be written in one programming language or any combination of more programming languages. These program codes may be provided to a processor or controller of a general-purpose computer, a dedicated computer or other programmable data processing apparatus, such that the program codes, when executed by the processor or controller, cause the functions/operations specified in the flowcharts and/or block diagrams to be implemented. The program codes may be executed entirely on a machine, partially on a machine, partially on a machine and partially on a remote machine as a stand-alone software package or entirely on a remote machine or server.

In the context of the present disclosure, a machine-readable medium may be a tangible medium that may contain or store a program for use by or in connection with an instruction execution system, an apparatus or a device. The machine-readable medium may be a machine-readable signal medium or a machine-readable storage medium. The machine-readable medium may include, but is not limited to, an electronic, magnetic, optical, electromagnetic, infrared, or semiconductor system, apparatus or device, or any suitable combination of the above. More specific examples of the machine-readable storage medium may include an electrical connection based on one or more wires, a portable computer disk, a hard disk, a random access memory (RAM), a read only memory (ROM), an erasable programmable read only memory (EPROM or a flash memory), an optical fiber, a compact disk read only memory (CD-ROM), an optical storage device, a magnetic storage device, or any suitable combination of the above.

In order to provide interaction with the user, the systems and technologies described here may be implemented on a computer including a display device (for example, a CRT (cathode ray tube) or LCD (liquid crystal display) monitor) for displaying information to the user, and a keyboard and a pointing device (for example, a mouse or a trackball) through which the user may provide the input to the computer. Other types of devices may also be used to provide interaction with the user. For example, a feedback provided to the user may be any form of sensory feedback (for example, visual feedback, auditory feedback, or tactile feedback), and the input from the user may be received in any form (including acoustic input, voice input or tactile input).

The systems and technologies described herein may be implemented in a computing system including back-end components (for example, a data server), or a computing system including middleware components (for example, an application server), or a computing system including front-end components (for example, a user computer having a graphical user interface or web browser through which the user may interact with the implementation of the system and technology described herein), or a computing system including any combination of such back-end components, middleware components or front-end components. The components of the system may be connected to each other by digital data communication (for example, a communication network) in any form or through any medium. Examples of the communication network include a local area network (LAN), a wide area network (WAN), and the Internet.

The computer system may include a client and a server. The client and the server are generally far away from each other and usually interact through a communication network. The relationship between the client and the server is generated through computer programs running on the corresponding computers and having a client-server relationship with each other. The server may be a cloud server, a server of a distributed system, or a server combined with a block-chain.

It should be understood that steps of the processes illustrated above may be reordered, added or deleted in various manners. For example, the steps described in the present disclosure may be performed in parallel, sequentially, or in a different order, as long as a desired result of the technical solution of the present disclosure may be achieved. This is not limited in the present disclosure.

The above-mentioned specific embodiments do not constitute a limitation on the scope of protection of the present disclosure. Those skilled in the art should understand that various modifications, combinations, sub-combinations and substitutions may be made according to design requirements and other factors. Any modifications, equivalent replacements and improvements made within the spirit and principles of the present disclosure shall be contained in the scope of protection of the present disclosure.

What is claimed is:

1. A method of processing data for an autonomous vehicle, comprising:
acquiring sensor data for the autonomous vehicle, wherein the sensor data comprises inertial measurement data, LiDAR data, and visual image data;
determining a first constraint factor for the inertial measurement data according to the inertial measurement data and the visual image data;
determining a second constraint factor for the LiDAR data according to the inertial measurement data and the LiDAR data;
determining a third constraint factor for the visual image data according to the inertial measurement data, the visual image data, and the LiDAR data;
processing the sensor data based on the first constraint factor, the second constraint factor, and the third constraint factor, so as to obtain positioning data; and
positioning the autonomous vehicle by using the positioning data, wherein
the determining a third constraint factor for the visual image data according to the inertial measurement data, the visual image data, and the LiDAR data includes:
determining a depth information of the visual image data according to the visual image data and the LiDAR data;
determining a mapping relationship between the visual image data and the inertial measurement data according to the visual image data and the inertial measurement data; and
determining the third constraint factor according to the depth information and the mapping relationship, and
the determining a depth information of the visual image data according to the visual image data and the LiDAR data includes:
determining an initial inertial measurement relative pose at a visual image acquisition time instant of the visual image data relative to a radar data acquisition time instant of adjacent radar data;
determining a first projection position of the LiDAR data to a visual image data plane according to the visual image acquisition time instant, the radar data acquisition time instant, and the initial inertial measurement relative pose;
determining an image projection time instant and an updated inertial measurement relative pose according to the first projection position; and
determining the depth information of the visual image data according to the updated inertial measurement relative pose.

2. The method according to claim 1, wherein the LiDAR data comprises a plurality of frames of laser point cloud data; and the determining a second constraint factor for the LiDAR data according to the inertial measurement data and the LiDAR data comprises:
determining an initial relative pose between a first frame of laser point cloud data and a second frame of laser point cloud data among the plurality of frames of laser point cloud data according to the inertial measurement data, the first frame of laser point cloud data and the second frame of laser point cloud data;
determining first projection data of the first frame of laser point cloud data and second projection data of the second frame of laser point cloud data, respectively;
adjusting the initial relative pose according to the first projection data and the second projection data, so as to obtain a relative pose between point cloud frames; and
determining the second constraint factor according to the relative pose between point cloud frames.

3. The method according to claim 2, wherein the first projection data comprises N voxels, the second projection data comprises N voxels, and N is an integer greater than 1; the adjusting the initial relative pose according to the first projection data and the second projection data, so as to obtain a relative pose between point cloud frames comprises:
performing N iterations according to the initial relative pose and each of the N voxels, so as to obtain an $N^{th}$ relative pose as the relative pose between point cloud frames.

4. The method according to claim 3, wherein the first projection data comprises a first projection image and a first normal vector, and the second projection data comprises a second projection image and a second normal vector; the adjusting the initial relative pose according to the first projection data and the second projection data, so as to obtain a relative pose between point cloud frames comprises:
in an $i^{th}$ iteration of the N iterations:
determining a distance threshold and an angle threshold according to i, where i is greater than or equal to 1 and less than or equal to N;
determining, in response to a determination that a distance between an $i^{th}$ first pixel in the first projection image and an $i^{th}$ second pixel in the second projection image is less than or equal to the distance threshold and that an angle between the first normal vector corresponding to an $i^{th}$ pixel and the second normal vector corresponding to the $i^{th}$ pixel is less than or equal to the angle threshold, an $i^{th}$ relative pose by using an $(i-1)^{th}$ relative pose obtained from an $(i-1)^{th}$ iteration, the $i^{th}$ first pixel, the $i^{th}$ second pixel, the first normal vector corresponding to the $i^{th}$ pixel, and the second normal vector corresponding to the $i^{th}$ pixel.

5. The method according to claim 1, wherein the determining an image projection time instant and an updated inertial measurement relative pose according to the first projection position comprises:
determining a first inertial measurement relative pose at the visual image acquisition time instant relative to the image projection time instant;
determining a second inertial measurement relative pose at the image projection time instant relative to the laser data acquisition time instant; and
performing an interpolation on the initial inertial measurement relative pose by using the first inertial measurement relative pose and the second inertial measurement relative pose, so as to obtain the updated inertial measurement relative pose.

6. The method according to claim 1, wherein the processing the sensor data based on the first constraint factor, the second constraint factor and the third constraint factor, so as to obtain positioning data comprises: determining X as the positioning data, wherein the X satisfies:

$$\min_{X}\left\{\sum\left\|r_{imu}\left(\hat{z}_{b_{k+1}}^{b_k}, X\right)\right\|^2 + \sum\left\|r_{vision}\left(\hat{z}_{l}^{c_j}, X\right)\right\|^2 + \sum\left\|r_{icp}\left(\hat{z}_{s}^{e}, X\right)\right\|^2\right\}$$

where $r_{imu}$ $$\left(\hat{z}_{b_{k+1}}^{b_k}, X\right)$$

represents the first constraint factor, $r_{vision}(\hat{z}_l^{c_j},X)$ represents the third constraint factor, $r_{icp}(\hat{z}_s^e,X)$ represents the second constraint factor;

$$\hat{z}_{b_{k+1}}^{b_k}$$

represents the inertial measurement data, $\hat{z}_l^{c_j}$ represents the visual image data, and $\hat{z}_s^e$ represents the LIDAR data.

7. The method according to claim 1, wherein the inertial measurement data is acquired by an inertial sensor; and the method further comprises:
   initializing a velocity of the inertial sensor and an acceleration of the inertial sensor according to the LiDAR data and the first constraint factor.

8. An electronic device, comprising:
   at least one processor; and
   a memory communicatively connected to the at least one processor, wherein the memory stores instructions executable by the at least one processor, and the instructions, when executed by the at least one processor, cause the at least one processor to implement the method of claim 1.

9. The electronic device according to claim 8, wherein the LiDAR data comprises a plurality of frames of laser point cloud data; and the at least one processor is further configured for:
   determining an initial relative pose between a first frame of laser point cloud data and a second frame of laser point cloud data among the plurality of frames of laser point cloud data according to the inertial measurement data, the first frame of laser point cloud data and the second frame of laser point cloud data;
   determining first projection data of the first frame of laser point cloud data and second projection data of the second frame of laser point cloud data, respectively;
   adjusting the initial relative pose according to the first projection data and the second projection data, so as to obtain a relative pose between point cloud frames; and
   determining the second constraint factor according to the relative pose between point cloud frames.

10. The electronic device according to claim 9, wherein the first projection data comprises N voxels, the second projection data comprises N voxels, and N is an integer greater than 1; and the at least one processor is further configured for:
    performing N iterations according to the initial relative pose and each of the N voxels, so as to obtain an $N^{th}$ relative pose as the relative pose between point cloud frames.

11. The electronic device according to claim 10, wherein the first projection data comprises a first projection image and a first normal vector, and the second projection data comprises a second projection image and a second normal vector; the at least one processor is further configured for:
    in an $i^{th}$ iteration of the N iterations:
       determining a distance threshold and an angle threshold according to i, where i is greater than or equal to 1 and less than or equal to N;
       determining, in response to a determination that a distance between an $i^{th}$ first pixel in the first projection image and an $i^{th}$ second pixel in the second projection image is less than or equal to the distance threshold and that an angle between the first normal vector corresponding to an $i^{th}$ pixel and the second normal vector corresponding to the $i^{th}$ pixel is less than or equal to the angle threshold, an $i^{th}$ relative pose by using an $(i-1)^{th}$ relative pose obtained from an $(i-1)^{th}$ iteration, the $i^{th}$ first pixel, the $i^{th}$ second pixel, the first normal vector corresponding to the $i^{th}$ pixel, and the second normal vector corresponding to the $i^{th}$ pixel.

12. The electronic device according to claim 8, wherein the at least one processor is further configured for:
    determining a first inertial measurement relative pose at the visual image acquisition time instant relative to the image projection time instant;
    determining a second inertial measurement relative pose at the image projection time instant relative to the laser data acquisition time instant; and
    performing an interpolation on the initial inertial measurement relative pose by using the first inertial measurement relative pose and the second inertial measurement relative pose, so as to obtain the updated inertial measurement relative pose.

13. The electronic device according to claim 8, wherein the at least one processor is further configured for: determining X as the positioning data, wherein the X satisfies:

$$\min_X\left\{\sum\left\|r_{imu}\left(\hat{z}_{b_{k+1}}^{b_k}, X\right)\right\|^2 + \sum\left\|r_{vision}(\hat{z}_l^{c_j}, X)\right\|^2 + \sum\left\|r_{icp}(\hat{z}_s^e, X)\right\|^2\right\}$$

where $r_{imu}$ $$\left(\hat{z}_{b_{k+1}}^{b_k}, X\right)$$

represents the first constraint factor, $r_{vision}(\hat{z}_l^{c_j},X)$ represents the third constraint factor, $r_{icp}(\hat{z}_s^e,X)$ represents the second constraint factor;

$$\hat{z}_{b_{k+1}}^{b_k}$$

represents the inertial measurement data, $\hat{z}_l^{c_j}$ represents the visual image data, and $\hat{z}_s^e$ represents the LiDAR data.

14. The electronic device according to claim 8, wherein the inertial measurement data is acquired by an inertial sensor; and the at least one processor is further configured for:
    initializing a velocity of the inertial sensor and an acceleration of the inertial sensor according to the LiDAR data and the first constraint factor.

15. A non-transitory computer-readable storage medium having computer instructions therein, wherein the computer instructions are configured to cause a computer to implement the method of claim 1.

16. An autonomous vehicle, comprising the electronic device according to claim 8.

* * * * *